US008487895B1

(12) United States Patent
Brown

(10) Patent No.: US 8,487,895 B1
(45) Date of Patent: Jul. 16, 2013

(54) SYSTEMS AND METHODS FOR ENHANCING TOUCH EVENT PROCESSING PERFORMANCE

(75) Inventor: Jeff Brown, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/534,654

(22) Filed: Jun. 27, 2012

Related U.S. Application Data

(63) Continuation of application No. 13/533,408, filed on Jun. 26, 2012.

(51) Int. Cl.
*G06F 3/041* (2006.01)

(52) U.S. Cl.
USPC .......................................... 345/173; 345/156

(58) Field of Classification Search
None
See application file for complete search history.

(56) References Cited

U.S. PATENT DOCUMENTS

| | | | |
|---|---|---|---|
| 4,008,379 A | | 2/1977 | Watkins |
| 5,494,573 A * | | 2/1996 | Schoenmeyr et al. .......... 210/94 |
| 5,832,474 A * | | 11/1998 | Lopresti et al. ....................... 1/1 |
| 6,345,302 B1 | | 2/2002 | Bennett et al. |
| 6,499,116 B1 | | 12/2002 | Roth et al. |
| 6,789,030 B1 | | 9/2004 | Coyle et al. |
| 6,850,092 B2 | | 2/2005 | Chelcea et al. |
| 6,957,305 B2 | | 10/2005 | Ray et al. |
| 7,103,890 B2 | | 9/2006 | Bush |
| 2004/0044847 A1 | | 3/2004 | Ray et al. |
| 2004/0194113 A1 * | | 9/2004 | Bush ............................. 719/313 |
| 2007/0094416 A1 | | 4/2007 | Goldstein et al. |
| 2008/0062148 A1 * | | 3/2008 | Hotelling et al. ............. 345/174 |
| 2010/0020025 A1 * | | 1/2010 | Lemort et al. ................. 345/173 |
| 2011/0066984 A1 * | | 3/2011 | Li ................................... 715/863 |
| 2011/0298724 A1 * | | 12/2011 | Ameling et al. .............. 345/173 |

* cited by examiner

*Primary Examiner* — Sumati Lefkowitz
*Assistant Examiner* — Jesus Hernandez
(74) *Attorney, Agent, or Firm* — Troutman Sanders LLP; James E. Schutz; Mark Lehi Jones

(57) ABSTRACT

Certain embodiments of the disclosed technology may include systems and methods for enhancing touch event processing performance. According to an example embodiment of the disclosed technology, a method is provided for receiving, at an input dispatcher, touch events from one or more input devices. The method also includes batching the received touch events. Batching can include accumulating the received touch events for a predetermined duration corresponding to a screen refresh rate. The method also includes directing the batched touch events to event receivers associated with one or more applications. The one or more applications asynchronously control receipt of the batch touch events.

21 Claims, 6 Drawing Sheets

SYSTEMS AND METHODS FOR ENHANCING TOUCH EVENT PROCESSING PERFORMANCE

RELATED APPLICATIONS

This application is a continuation of non-provisional application Ser. No. 13/533,408, filed on Aug. 26, 2012, entitled: "Systems and Methods for Enhancing Touch Event Processing Performance," the contents of which are hereby incorporated by reference in their entirety.

FIELD OF THE DISCLOSED TECHNOLOGY

This disclosed technology generally relates to mobile devices, and in particular, to enhancing touch-event processing performance.

BACKGROUND

Mobile device screens are increasingly being used as interfaces for touch events. Complex or multi-touch events, in particular, tend to generate a large amount of information that can overload the interface or the application. For example, a single touch event might describe the position, size, pressure and orientation of one or more fingers. Upwards of 100 touch events may be delivered to an application every second. One of the challenges that mobile device designers and engineers face is to minimize the latency between touch events and the availability of the touch event for use by an application.

BRIEF SUMMARY

Some or all of the above needs may be addressed by certain embodiments of the disclosed technology. Certain embodiments of the disclosed technology may include systems and methods for enhancing touch event processing performance in mobile devices.

According to an example embodiment of the disclosed technology, a method is provided for receiving, at an input dispatcher, touch events from one or more input devices. The method also includes batching the received touch events. Batching can include accumulating the received touch events for a predetermined duration corresponding to a screen refresh rate. The method also includes directing the batched touch events to event receivers associated with one or more applications. The one or more applications asynchronously control receipt of the batch touch events.

According to another example embodiment, a system is provided. The system includes a touch screen, at least one memory for storing data and computer-executable instructions, and at least one processor in communication with the touch screen. The at least one processor is configured to access the at least one memory, and further configured to execute the computer-executable instructions to receive, at an input dispatcher, touch events from the touch screen. The at least one processor is further configured to execute the computer-executable instructions to batch the touch events, which includes accumulating the received touch events for a predetermined duration corresponding to a screen refresh rate associated with the touch screen. The at least one processor is further configured to execute the computer-executable instructions to direct the batched touch events to event receivers associated with one or more applications. The one or more applications asynchronously control receipt of the batch touch events.

According to another example embodiment, a computer-readable medium that stores instructions executable by one or more processors to perform a method is provided. The method includes receiving, at an input dispatcher, touch events from one or more input devices. The method also includes batching the received touch events. Batching can include accumulating the received touch events for a predetermined duration corresponding to a screen refresh rate. The method also includes directing the batched touch events to event receivers associated with one or more applications. The one or more applications asynchronously control receipt of the batch touch events.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
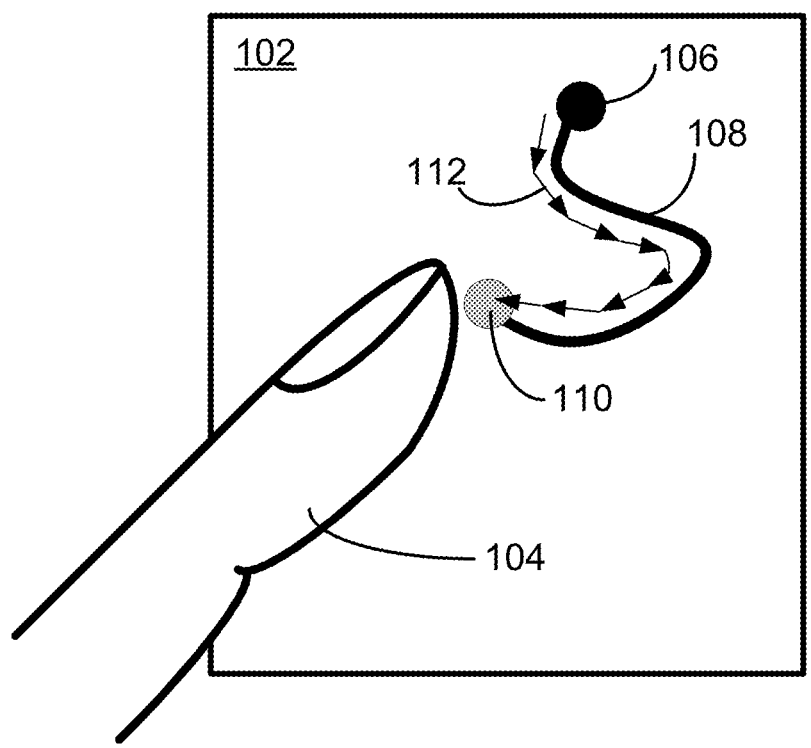
FIG. 1 depicts and illustrative touch screen 102 and example touch events according to an example embodiment of the disclosed technology.

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. References to "one embodiment," "an embodiment," "example embodiment," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Various embodiments of the disclosed technology address issues associated with touch event latency and throughput. Example touch events can include simple localized gestures, such as touching and releasing. Other touch events can include complex gestures, such as swiping, pinching, tracing, etc. When a touch screen is utilized as an input device for an application, the application receiving the input may not be able to keep up with processing the previous touch data before new data arrives, particularly since the rate at which touch data arrives can depend on the input gesture speed and complexity. A slow moving, single finger swipe across the screen, for example, may produce a relatively slow and constant stream of position samples that can easily be handled by an application. However, a quick, complex, and/or multi-finger touch gesture may overwhelm the application with touch data and may lead to errors.

A typical display screen has a refresh rate of 60 Hz, and therefore, the screen image can be re-rendered approximately every 16.6 milliseconds using available touch event data. If the application is overwhelmed or if the touch data from the touch screen is delayed due to other bottlenecks, then a less than ideal interaction with the touch screen may be experienced by a user. For example, certain applications utilize touch gestures for rendering images to the screen at a refresh rate in near real-time based on the current position of the touch gesture. When an icon or other graphical object is dragged from one location of a screen to another, the movement of the graphical object may appear to be smooth or jerky, depending on speed at which the data can be handled. Example embodiments of the disclosed technology can involve supplying touch data to the application so that the application can utilize the touch data as fast as it can. Certain implementations may provide a series of screen renderings that are smooth and accurate.

Example embodiments may eliminate or reduce the bottleneck of data transfer between the touch screen and the application, and may in turn, reduce or minimize the amount of time elapsed between a touch event and the utilization of the event by an application. In an example embodiment, touch gestures may be time-stamped and batched or grouped according to a screen refresh rate for more efficient utilization of bandwidth and/or processing power.

In one example embodiment, events from the touch screen may be directed to the appropriate application by an event dispatcher as soon as the events are available. In another example embodiment, the application may control when it utilizes the events. According to an example embodiment, acknowledgement of received events may be utilized between the application and the input dispatcher, for example, to control streaming, buffering and/or queuing (or messaging that the application has stopped responding). Eventual acknowledgement of event receipt may be allowed within given time constraints to avail the application with as many of touch events as it can handle. In this manner, communication from the touch screen to the application may be asynchronous, and latency may be reduced or minimized by decoupling the dispatcher from the application so that both can run independently.

Example embodiments of the disclosed technology utilize the screen refresh rate for batching, grouping, and/or synchronizing touch events. For example, communication from the touch screen via the input dispatcher to an event receiver in the application can include batches with multiple touch events per refresh period to increase throughput. Example embodiments can receive and handle multiple gestures or touch events from the touch screen and queue the events so that the application can take whatever is in the queue. According to an example embodiment, acknowledgment of a previous event is not needed before receiving new events.

Various hardware and firmware/software architectures may be utilized for enhancing touch event processing performance, according to example embodiments of the disclosed technology, and will now be described with reference to the accompanying figures.

FIG. 1 depicts and illustrative touch screen 102 with example touch events. In a typical scenario a user may use a finger 104 or a stylus to interact with the touch screen 102. The touch event may include an initial location of contact 106, a trace path 108 where the finger 104 or stylus remains in contact with the touch screen 102 while traversing the path 108, and an exit location 110, where the finger 104 or stylus is removed from the touch screen 102.

According to an example embodiment of the disclosed technology, the trace path 108 may be sampled and approximated by a series of individual trace segments 112. In one example embodiment, the division of the trace segments 112 from the trace path 108 may be based on timing. For example, slow gesture movements may result in relatively short segments 112, while fast gesture movements may result in relatively longer segments 112. In an example embodiment, the velocity and/or acceleration of the finger 104 or stylus along the trace path 108 may be determined from the length of the segments 112. In other example embodiments, the velocity and/or acceleration of the finger 104 or stylus along the trace path may be determined from position and timing information. For example, a distance $\Delta x$ may be calculated between a trace path position at time $t_1$ and another trace path position at time $t_2$ to determine the approximate or average local velocity, $v_i = \Delta x / \Delta t$, where $\Delta t = t_2 - t_1$ and i may represent the approximate local position along the trace path. In an example embodiment, the approximate acceleration of finger 104 or stylus along the trace path may be determined from changes in the average local velocity, for example the local acceleration may be represented as $a_i = \Delta v_i = v_i - v_{i-1}$.

Figure 2:
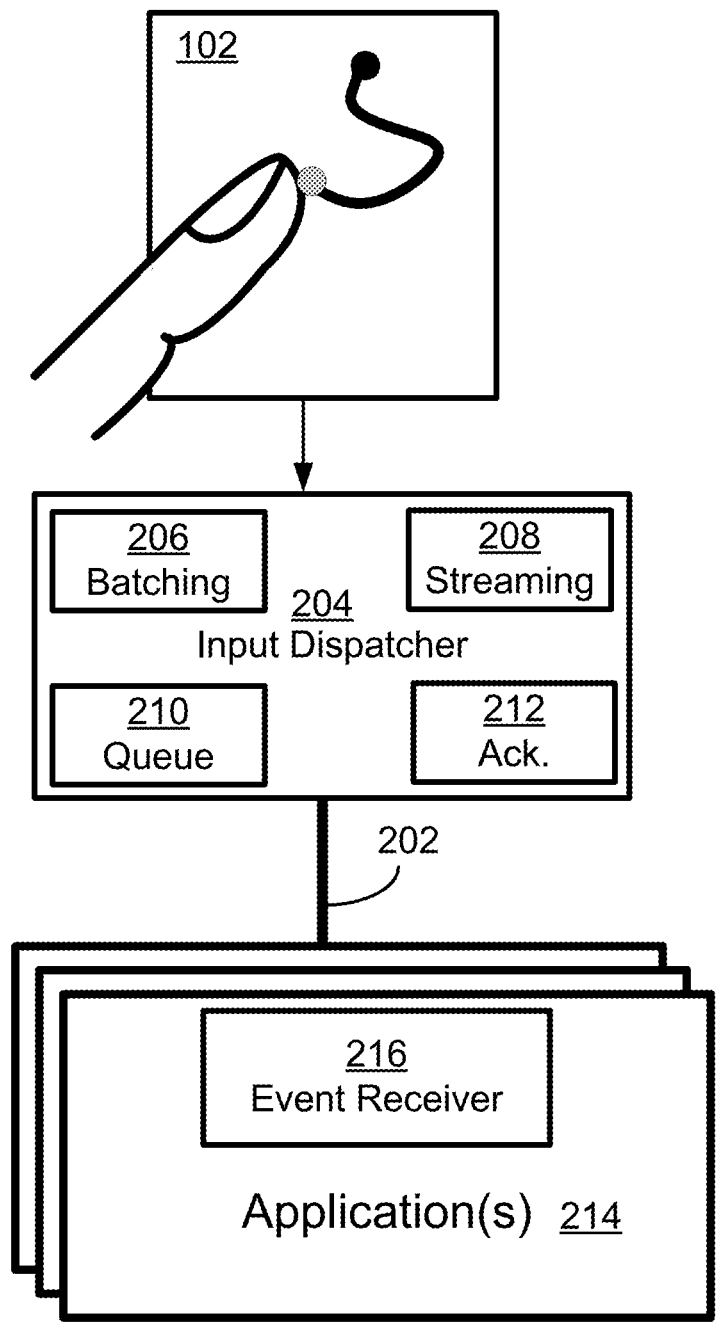
FIG. 2 is block diagram of an illustrative touch event processing system, according to an example embodiment of the disclosed technology.

FIG. 2 is block diagram of an illustrative touch event processing system, according to an example embodiment of the disclosed technology. In an example embodiment, an input dispatcher 204 may provide an interface between a touch screen 102 and an event receiver 216 associated with one or more applications 214. In an example embodiment, the input dispatcher 204 may communicate with the event receiver 216 via an in-order communications channel 102. In accordance with an example embodiment, the in-order communications channel 102 may provide in-order packet delivery from the input dispatcher 204 to the event receiver 216. Those skilled in the art recognize that an in-order communications network is a critical abstraction for a wide range of application protocols such as file transfer protocols and optimized cache coherence protocols. Implementations of direct-communication computation models such as stream computing also require that packets be delivered in the order they were sent, as do explicit message-passing applications. Example embodiments of the disclosed technology may rely on the in-order communications channel 102 for proper delivery of touch events to the application 213.

In accordance with an example embodiment, the input dispatcher 204 may include modules or blocks, for example, which may provide various functions including, but not limited to, batching, streaming, queuing, acknowledgement, etc. For example, a batching module 206 may be utilized for grouping touch events according to timing. For example, batching of touch events may include grouping events by time slots related to the refresh rate of the touch screen. Detailed information with regard to an example batching process will be discussed in detail below in relation to FIG. 5.

In an example embodiment, and with continued reference to FIG. 2, the input dispatcher 204 may include a streaming module 208 that may be utilized for communicating certain events from the touch screen 102 to the application 214. In accordance with certain example embodiments of the disclosed technology, a queue module 210 may be utilized for storing or buffering touch event data as it is available, and until the application is ready to receive the data.

In an example embodiment, the input dispatcher 204 may include an acknowledgement module 212 that may provide communications between the input dispatcher 204 and the application 214 for acknowledging that touch event data has been received by the application. According to certain example embodiments, the acknowledgement module 212 may allow event data to be sent to the event receiver 216 (and/or the application 214) and may subsequently receive acknowledgements that the sent data was received and/or utilized by the application. Then, according to an example embodiment, subsequent event data may be sent to the event receiver 216 before an acknowledgement of the previously sent data is received from the event receiver 216 or the application 214. According to certain example embodiments, the acknowledgement module 212 may time-out after a predetermined amount of time has elapsed without receipt of an acknowledgement of the previously sent touch event data. In certain embodiments, the time-out may be a few or several seconds, and a time-out may indicate that the application has stopped responding.

Figure 3:
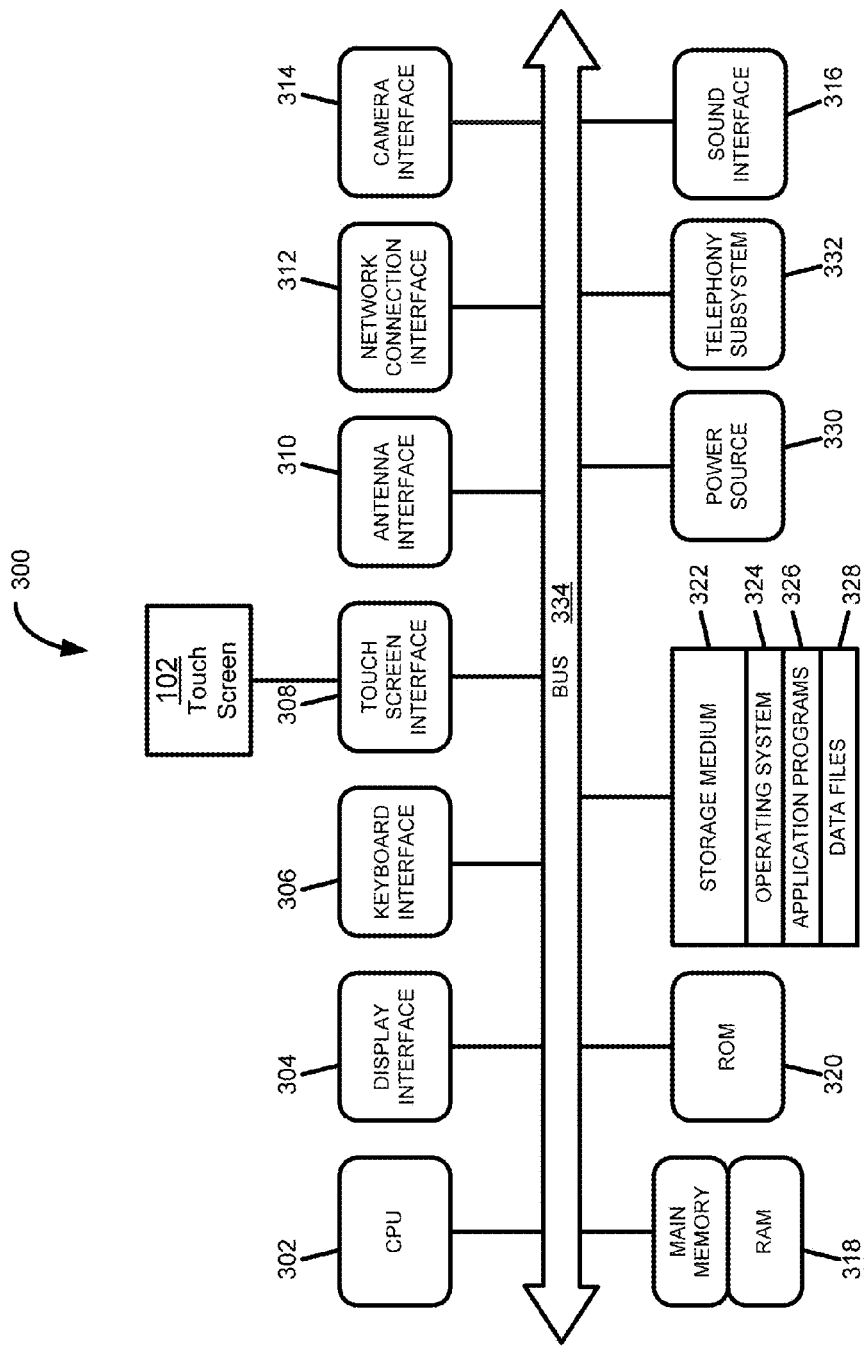
FIG. 3 is a block diagram of an illustrative computing device architecture, according to an example embodiment of the disclosed technology.

FIG. 3 is a block diagram of an illustrative computing device architecture 300, according to an example embodiment of the disclosed technology. Various embodiments of the communication systems and methods herein may be embodied in non-transitory computer readable media for execution by a processor. An example embodiment may be used in an application of a mobile computing device, such as a smartphone or tablet, but other computing devices may also be used. It will be understood that the architecture illustrated in FIG. 3 is provided for example purposes only and does not limit the scope of the various embodiments of the communication systems and methods.

The architecture 300 of FIG. 3 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or touch screen 102. Example embodiments of the architecture 300 may include an antenna interface 310 that provides a communication interface to an antenna; a network connection interface 312 that provides a communication interface to a network such as Wi-Fi. In certain embodiments, a camera interface 314 is provided that acts as a communication interface and provides functions for capturing digital images from a camera. In certain embodiments, a sound interface 316 is provided as a communication interface for converting sound into electrical signals using a microphone and for converting electrical signals into sound using a speaker. According to example embodiments, a random access memory (RAM) 318 is provided, where computer instructions and data are stored in a volatile memory device for processing by the CPU 302.

According to an example embodiment, the architecture 300 includes a read-only memory (ROM) 320 where invariant low-level systems code or data for basic system functions such as basic input and output (I/O), startup, or reception of keystrokes from a keyboard are stored in a non-volatile memory device. According to an example embodiment, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example embodiment, the architecture 300 includes a power source 330 that provides an appropriate alternating current (AC) or direct current (DC) to power components. According to an example embodiment, the architecture 300 includes and a telephony subsystem 332 that allows the device 300 to transmit and receive sound over a telephone network. The constituent devices and the CPU 302 communicate with each other over a bus 334.

In accordance with example embodiments, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
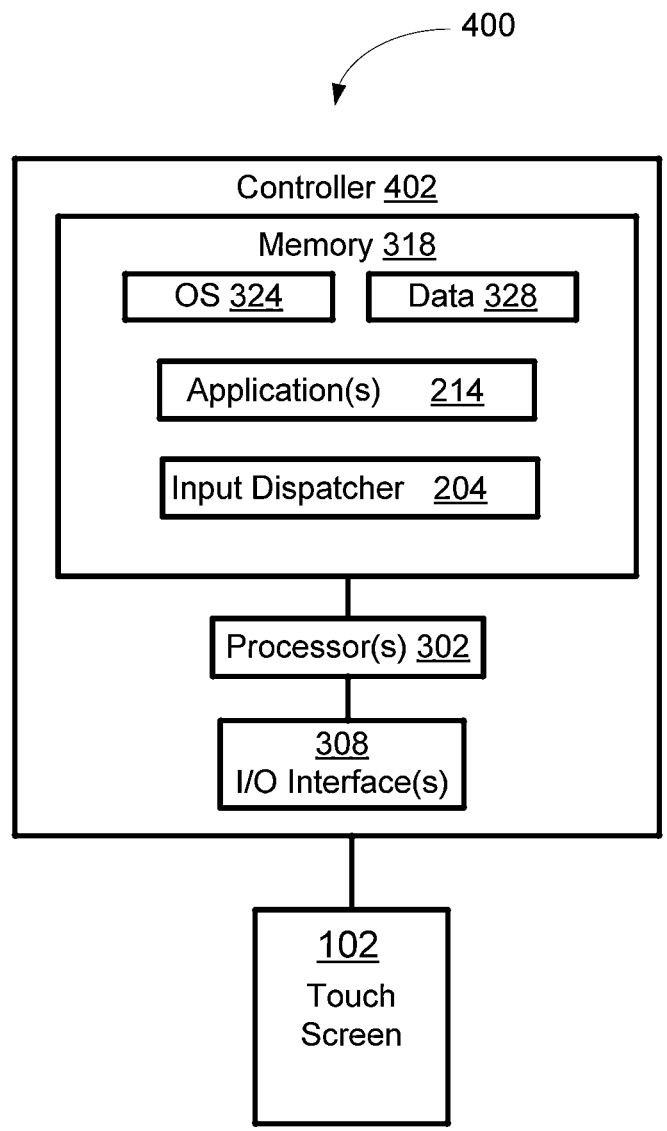
FIG. 4 is a block diagram of an illustrative mobile computing device, according to an example embodiment of the disclosed technology.

FIG. 4 is another block diagram of an illustrative mobile computing device 400, according to an example embodiment of the disclosed technology. The mobile computing device 400 may include part or all of the architecture as in architecture 300 of FIG. 3. FIG. 4 depicts a simplified mobile computing device 400 including a controller 402 with memory 318, one or more processors 302 in communication with the memory 318, and an input/output interface 308 in communication with the one or more processors 302 and the touch screen 102. According to an example embodiment, the memory 318 may include the operating system 324, data 328, one or more applications 214 an input dispatcher 204. An event receiver (not shown) as depicted in FIG. 2 may be associated with the application 214.

Figure 5:
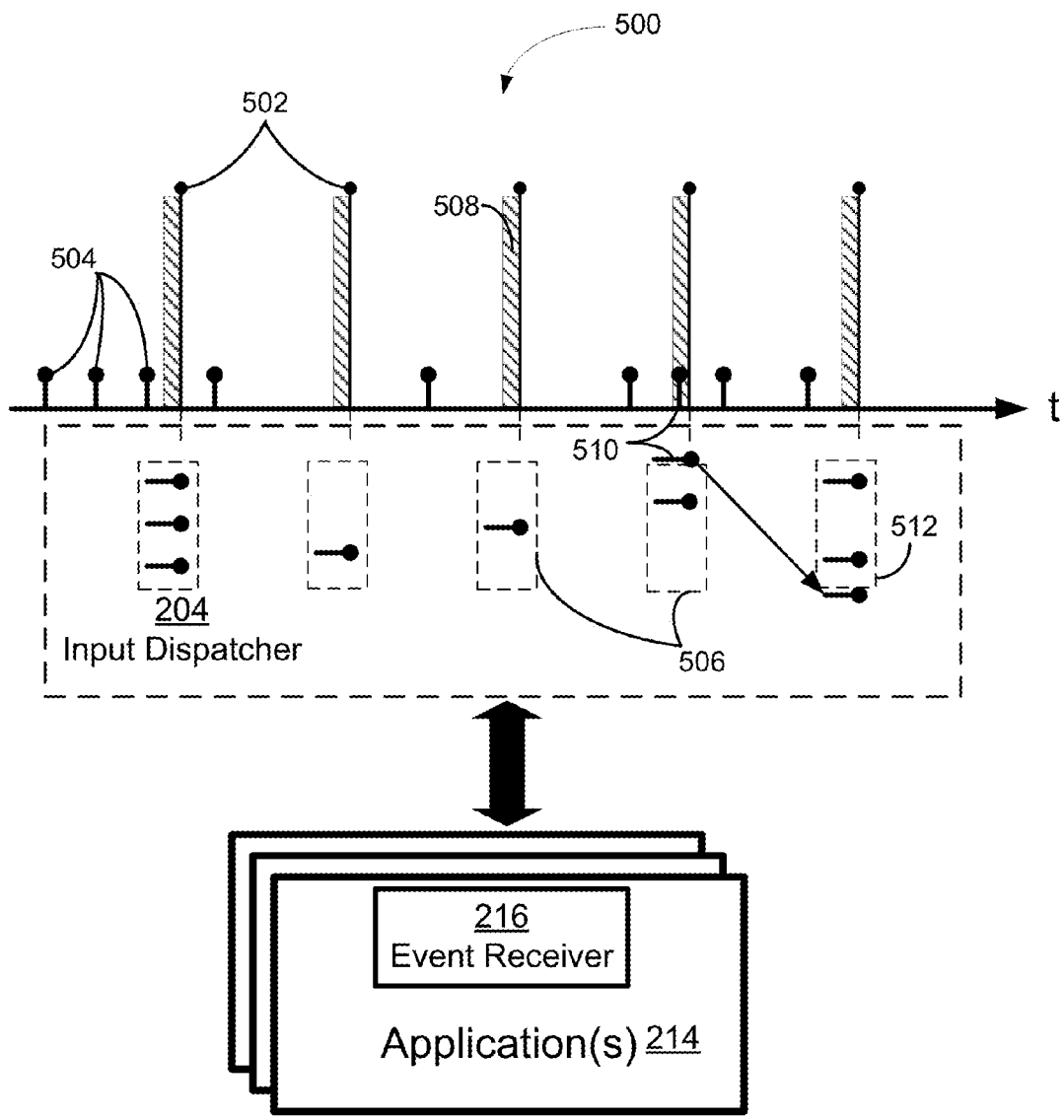
FIG. 5 depicts batching of touch events according to an example embodiment of the disclosed technology.

FIG. 5 depicts batching 500 of touch events 504 according to an example embodiment of the disclosed technology. The touch events 504 may include any of the following: initial location of contact 106, a trace path 108, a portion of a trace path, and an exit location 110, or one or more segments 112 as depicted in FIG. 1. The touch events 504 may also include portions of complex gestures, such as swiping, pinching, tracing, etc.

According to an example embodiment of the disclosed technology, the trace path 108 may be approximated by a series of individual trace segments 112 In an example embodiment, the touch events 504 may arrive from the touch screen and may be grouped and sent in batches 506 from the input dispatcher 204 to the event receiver 216 for use with the application(s) 214. In an example embodiment of the disclosed technology, the grouping of the touch events 504 may be synchronized and grouped in batches 506 according to times that correspond to the screen refresh times 502 or the vertical sync.

According to an example embodiment, a dead band 508 may be utilized to define time intervals before the screen refresh times 502 for which the touch events arriving within that time interval may be handled with the next batch 512. In one embodiment, the dead band 508 duration may be a function of the processing speed of the touch event processors. For example, if the touch event arrives too close before the screen refresh time 502, there may not be sufficient time to process the event and include its data in the next screen rendering. In an example embodiment, such events may be processed with a subsequent screen rendering. For example, event 510 is depicted as arriving during the dead band 508 and is therefore, moved to the next batch 512 for processing. According to certain example embodiments, touch events 504, 510 may be time stamped. In certain example embodiments, the samples may be handled in a first in first out (FIFO) basis.

In one example embodiment, a timing period 502 may be equivalent to the vertical sync timing of the touch screen. In another example embodiment, the timing period 502 may represent a multiplier of the screen refresh rate or vertical sync frequency. For example, in one embodiment, the vertical sync frequency may be 60 Hz and all touch events 504 that occur within a given period of $1/60^{th}$ of a second may be batched for that period. In another example embodiment, the batching rate may be governed by a rate faster than the screen refresh rate. For example, in one embodiment, batching may be done at twice the frequency of the refresh rate. In other example embodiments, the batching may be done at any reasonable multiple of the screen refresh rate or vertical sync rate without departing from the scope of the disclosed technology. In other example embodiments, the batching may be tied to a timing cycle of a processor associated with the device.

Figure 6:
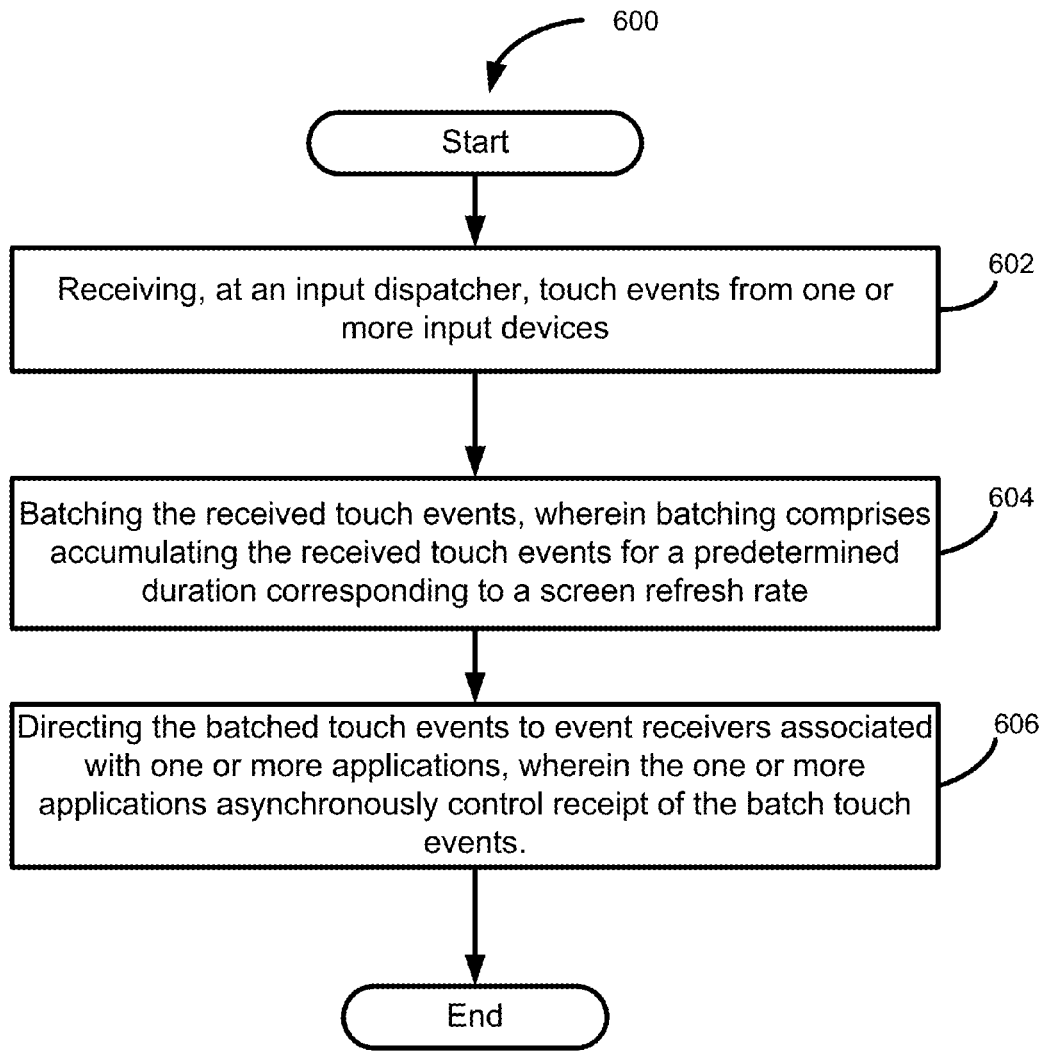
FIG. 6 is a flow diagram of a method according to an example embodiment of the disclosed technology.

An example method 600 for handling touch events 504 will now be described with reference to the flowchart of FIG. 6. The method 600 starts in block 602, and according to an example embodiment of the disclosed technology includes batching the received touch events, wherein batching includes accumulating the received touch events for a predetermined duration corresponding to a screen refresh rate. In block 604, the method 600 includes receiving, at an input dispatcher, touch events from one or more input devices. In block 606, the method 600 includes directing the batched touch events to event receivers associated with one or more applications, wherein the one or more applications asynchronously control receipt of the batch touch events. The method 600 ends after block 606.

Example embodiments may also include directing the buffered touch events 504 to the event receiver(s) 216, wherein the one or more applications 214 asynchronously control receipt of the buffered touch events 504. In certain example embodiments, touch events 504 may be buffered after an acknowledgement period of more than about 0.5 second. In other example embodiments the acknowledgement period may be greater than about 0.1 second and less than about 1 second. In accordance with certain example embodiments, batching the received touch events 504 can include accumulating touch events 504 until the application 214 requests reception of the touch events 504. In certain example embodiments, batching can include accumulating the touch events 504 during each vertical sync or refresh period. In one embodiment, the vertical sync period is $1/60^{th}$ of a second. In certain example embodiments, the receipt of the batch touch events may be asynchronously acknowledged.

According to example embodiments, certain technical effects can be provided, such as creating certain systems and methods that provide enhanced throughput of touch screen events. Example embodiments of the disclosed technology can provide the further technical effects of providing systems and methods for making touch screens more responsive with a reduction in latency between touch events and the response of an application.

In example embodiments of the disclosed technology, the computing device architecture 300 and/or the mobile computing device 400 may include any number of hardware and/or software applications that are executed to facilitate any of the operations. In example embodiments, one or more I/O interfaces may facilitate communication between the computing device architecture 300 and/or the mobile computing device 400 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device architecture 300 and/or the mobile computing device 400. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device architecture 300 and/or the mobile computing device 400 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the disclosed technology may include the computing device architecture 300 and/or the mobile computing device 400 with more or less of the components illustrated in FIG. 3 or 4.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain embodiments of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
   receiving, at an input dispatcher, touch events from one or more input devices;
   batching the received touch events, wherein batching comprises accumulating the received touch events for a pre-determined duration corresponding to a screen refresh rate, wherein a dead band defines a pre-determined time interval before a screen refresh in which the touch events arriving within the dead band are handled with a next batch; and
   directing the batched touch events to event receivers associated with one or more applications, wherein the one or more applications asynchronously control receipt of the batch touch events, and wherein asynchronously controlling receipt of the batch touch events comprises receiving the batch touch events at the one or more applications independent of the screen refresh rate without requiring acknowledgment of a previous event before receiving new events.

2. The method of claim 1, further comprising:
   buffering the touch events in a queue after a predetermined acknowledgement period has elapsed; and
   directing, by the one or more applications, the buffered touch events to the event receivers associated with one or more applications, wherein the one or more applications asynchronously control receipt of the buffered touch events.

3. The method of claim 2, wherein touch events are buffered after an acknowledgement period of more than about 0.5 second.

4. The method of claim 1, wherein batching the received touch events further comprises accumulating events until the application requests reception of the touch events.

5. The method of claim 1, wherein the batching comprises accumulating the touch events during each vertical sync period.

6. The method of claim 5, wherein the vertical sync period is $\frac{1}{60}^{th}$ of a second.

7. The method of claim 1, further comprising asynchronously acknowledging the receipt of the batch touch events.

8. A system comprising:
   a touch screen;
   at least one processor; and
   at least one memory for storing data and instructions that when executed by the at least one processor, cause the system to:
   receive, at an input dispatcher, touch events from the touch screen;
   batch the touch events, comprising accumulating the received touch events for a predetermined duration corresponding to a screen refresh rate associated with the touch screen, wherein a dead band defines a pre-determined time interval before a screen refresh in which the touch events arriving within the dead band are handled with a next batch; and direct the batched touch events to event receivers associated with one or more applications, wherein the one or more applications asynchronously control receipt of the batch touch events, and wherein asynchronously controlling receipt of the batch touch events comprises receiving the batch touch events at the one or more applications independent of the screen refresh rate without requiring acknowledgment of a previous event before receiving new events.

9. The system of claim 8, wherein the instructions, when executed by the at least one processor, further cause the system to asynchronously acknowledge the receipt of the batch touch events.

10. The system of claim 8, wherein the instructions, when executed by the at least one processor, further cause the system to:

buffer the touch events in a queue after a predetermined acknowledgement period has elapsed; and direct, by the one or more applications, the buffered touch events to the event receivers associated with one or more applications, wherein the one or more applications asynchronously control receipt of the buffered touch events.

11. The system of claim 10, wherein the instructions, when executed by the at least one processor, further cause the system to buffer the touch events after an acknowledgement period of more than about 0.5 second.

12. The system of claim 8, wherein the wherein the instructions, when executed by the at least one processor, further cause the system to accumulate touch events until the application requests reception of the touch events.

13. The system of claim 8, wherein batching comprises accumulating the touch events during each vertical sync period.

14. The system of claim 13, wherein the vertical sync period is $1/60^{th}$ of a second.

15. A non-transitory computer-readable medium that stores instructions that, when executed by at least one processor in a system, cause the system to perform a method comprising:

receiving, at an input dispatcher, touch events from one or more input devices;

batching the received touch events, wherein batching comprises accumulating the received touch events for a pre-determined duration corresponding to a screen refresh rate, wherein a dead band defines a pre-determined time interval before a screen refresh in which the touch events arriving within the dead band are handled with a next batch; and directing the batched touch events to event receivers associated with one or more applications, wherein the one or more applications asynchronously control receipt of the batch touch events, and wherein asynchronously controlling receipt of the batch touch events comprises receiving the batch touch events at the one or more applications independent of the screen refresh rate without requiring acknowledgment of a previous event before receiving new events.

16. The computer-readable medium of claim 15, that further stores instructions for asynchronously acknowledging the receipt of the batch touch events.

17. The computer-readable medium of claim 15, that further stores instructions for:

buffering touch events in a queue after a predetermined acknowledgement period has elapsed; and directing, by the one or more applications, the buffered touch events to the event receivers associated with one or more applications, wherein the one or more applications asynchronously control receipt of the buffered touch events.

18. The computer-readable medium of claim 17, that further stores instructions for buffering touch events after an acknowledgement period of more than about 0.5 second.

19. The computer-readable medium of claim 15, wherein batching the received touch events further comprises accumulating events until the application requests reception of the touch events.

20. The computer-readable medium of claim 15, wherein batching the received touch events further comprises accumulating the touch events during each vertical sync period.

21. The computer-readable medium of claim 20, wherein the vertical sync period is $1/60^{th}$ of a second.

* * * * *